(12) United States Patent  (10) Patent No.: US 8,480,775 B2
Peterson et al.  (45) Date of Patent: Jul. 9, 2013

(54) SELF CLEANING FAN ASSEMBLY (75) Inventors: Eric C. Peterson, Woodinville, WA (US); Christian L. Belady, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 12/972,537

(22) Filed: Dec. 20, 2010

(65) Prior Publication Data

US 2012/0151886 A1  Jun. 21, 2012

(51) Int. Cl.
*B01D 45/14* (2006.01)

(52) U.S. Cl.
USPC ............. 55/385.6; 55/396; 55/397; 55/398; 55/406; 55/447; 55/467

(58) Field of Classification Search
USPC ............ 55/383, 385.1, 385.2, 385.6, 385.7, 55/394, 396, 397, 398, 406, 437, 438, 447, 55/452
See application file for complete search history.

(56) References Cited

U.S. PATENT DOCUMENTS

| | | | | |
|---|---|---|---|---|
| 2,506,298 A * | 5/1950 | Griffen | | 55/416 |
| 3,854,910 A | 12/1974 | Hammerquist | | |
| 4,145,197 A * | 3/1979 | Strahsner et al. | | 55/401 |
| 5,044,887 A * | 9/1991 | Duthie et al. | | 416/223 B |
| 6,123,617 A | 9/2000 | Johnson | | |
| 6,156,089 A | 12/2000 | Stemmer et al. | | |
| 6,319,304 B1 * | 11/2001 | Moredock | | 95/269 |
| 6,425,943 B1 * | 7/2002 | Moredock | | 95/269 |
| 6,878,189 B2 * | 4/2005 | Moredock | | 95/270 |
| 7,494,535 B2 * | 2/2009 | Betting et al. | | 96/389 |
| 7,591,869 B2 * | 9/2009 | Jensen et al. | | 55/396 |
| 7,637,978 B2 * | 12/2009 | Jung | | 55/457 |
| 7,800,900 B1 | 9/2010 | Noteboom et al. | | |
| 8,152,881 B2 * | 4/2012 | Chen et al. | | 55/385.6 |
| 2002/0185004 A1 | 12/2002 | Willey et al. | | |
| 2004/0216611 A1 * | 11/2004 | Moredock | | 95/271 |
| 2005/0207115 A1 | 9/2005 | Barsun et al. | | |
| 2007/0022720 A1 | 2/2007 | Guertin | | |
| 2009/0101013 A1 * | 4/2009 | Moredock | | 95/269 |
| 2009/0168345 A1 | 7/2009 | Martini | | |
| 2010/0154838 A1 * | 6/2010 | Shih et al. | | 134/34 |
| 2010/0188810 A1 | 7/2010 | Andersen et al. | | |
| 2010/0238619 A1 * | 9/2010 | Shirasaka | | 361/679.08 |
| 2010/0275560 A1 * | 11/2010 | Chen et al. | | 55/385.7 |

FOREIGN PATENT DOCUMENTS

WO  WO 2007120535 A2 * 10/2007

OTHER PUBLICATIONS

"Products/Services for air mover pressure blower", Retrieved at <<http://www.globalspec.com/industrial-directory/air_mover_pressure_blower>>, Retrieved Date: Sep. 28, 2010, pp. 2.

* cited by examiner

Primary Examiner — Duane Smith
Assistant Examiner — Sonji Turner (57) ABSTRACT

This patent pertains to self-cleaning fan assemblies. One implementation includes electronic components positioned in an enclosure. This implementation also includes a fan assembly that is configured to impart rotational force on air to move the air from outside the enclosure to inside the enclosure and around the electronic components. The fan assembly is further configured to separate contaminants from the air based upon differences in density between the contaminants and the air.

20 Claims, 7 Drawing Sheets

SELF CLEANING FAN ASSEMBLY

BACKGROUND

Electrical equipment tends to have inherent inefficiencies that result in the conversion of some electrical energy to heat. This heat has to be addressed in some manner or the functional lifespan of the electrical equipment will be greatly reduced. In many scenarios, heat is removed by moving air through or proximate to the electrical equipment. For instance, computer systems and other information technology equipment use large volumes of air for cooling system components. In addition, many electronic components use heat sinks with high fin densities that require the cooling air to be filtered. Thus, intake air is often passed through a filter, such as a paper filter, to remove contaminants. The filters add cost and complexity to the overall system and cost and complexity to system maintenance since the filter has to be changed or cleaned. Also, filters increase the pressure drop across the system and thus more energy is used to achieve the same air flow. More importantly, the increase in pressure drop is not constant in that as the filter gets dirtier, airflow through the filter is further hampered and may not be sufficient for system requirements or more fan power is required to compensate for the increased pressure drop.

SUMMARY

This patent pertains to self-cleaning fan assemblies. One implementation includes electronic components positioned in an enclosure. This implementation also includes a fan assembly that is configured to impart rotational force on air to move the air from outside the enclosure to inside the enclosure and around the electronic components. The fan assembly is further configured to separate contaminants from the air based upon differences in density between the contaminants and the air.

The above listed example is provided for introductory purposes and does not include all of, and/or limit, the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This discussion relates to moving air in a manner that automatically separates contaminants from the air. For instance, a fan can be employed that imparts movement to the air and separates contaminants from the moving air without the need for filters. As used herein, "contaminants" can be anything in or with the air, which is heavier than air, such as water droplets, dirt, and other foreign objects, among others.

Briefly, as air encounters a fan, a rotational element is imparted on the air. The rotational element tends to cause any contaminants in the air to travel outward. This occurrence can be characterized as being due to centrifugal force generated by the fan on the air and any contaminants in the air. The present concepts leverage this occurrence to separate the contaminants from the air. It is worth noting that in practice, unlike traditional filters that further restrict airflow as they become clogged, the airflow in the present implementations can remain relatively constant and thus provide more consistent cooling. Specific structures for accomplishing this separation are described in more detail below relative to FIGS. 1-9.

EXAMPLES

Figure 1:
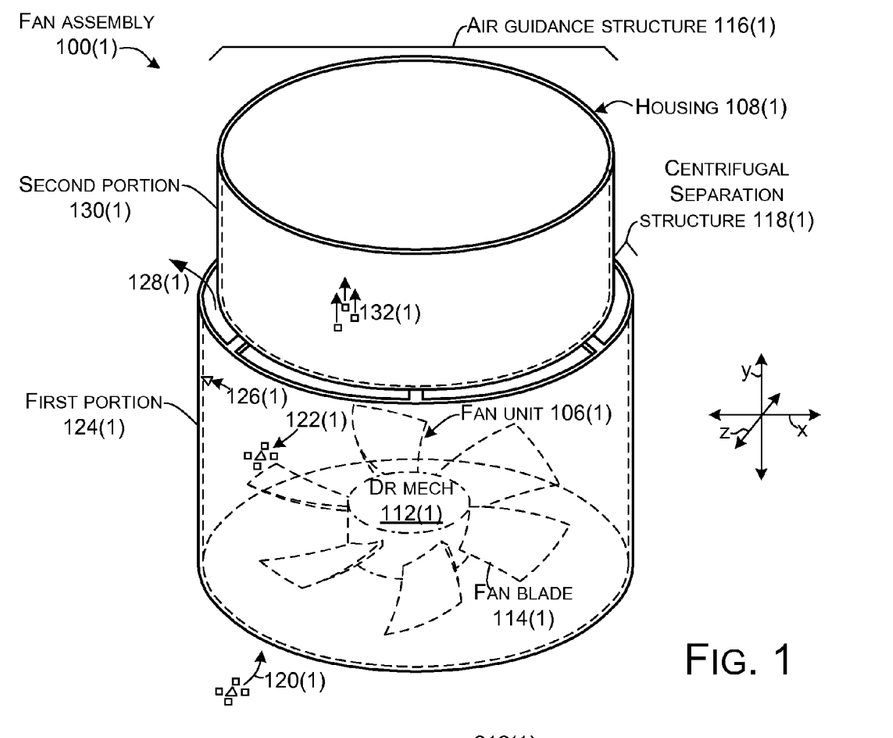
FIG. 1 is a perspective view of an example of a fan assembly that is consistent with the self-cleaning concepts in accordance with some implementations.
Figure 2:
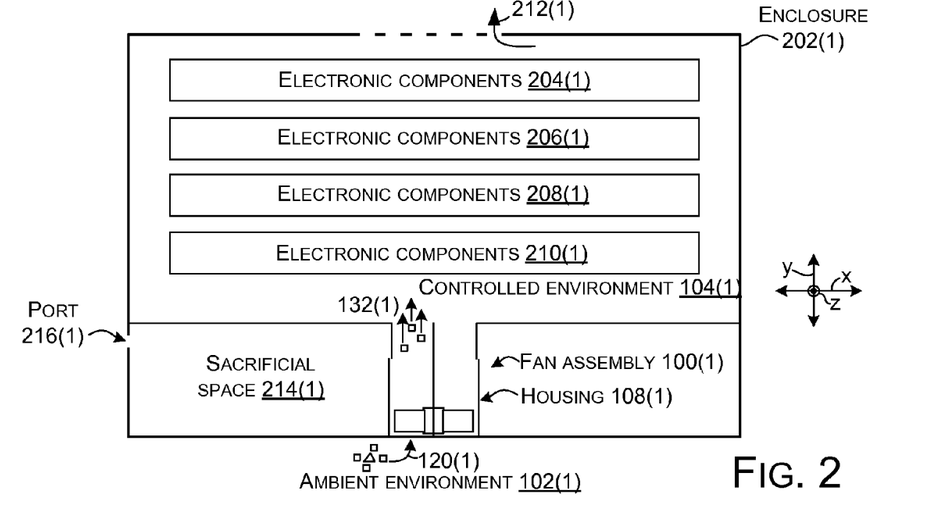
FIG. 2 is a sectional view of a fan assembly system employing the fan assembly of FIG. 1.

FIGS. 1-2 collectively show a self-cleaning fan assembly 100(1) configured to operate relative to an ambient environment 102(1) and a controlled environment 104(1) (FIG. 2). FIG. 1 is a relatively detailed view of the self cleaning fan assembly 100(1), while FIG. 2 shows less detail but shows the self cleaning fan assembly in an applied context.

In this case, the self-cleaning fan assembly 100(1) includes a fan unit 106(1) positioned relative to a housing 108(1). The fan unit 106(1) can include a drive mechanism (dr mech) 112(1) and one or more fan blades 114(1) (not all of which are labeled with specificity). The housing 108(1) can include an air guidance structure 116(1) and a centrifugal separation structure 118(1).

The drive mechanism 112(1), such as a motor, can turn the fan blades 114(1) to draw ambient air into the housing as indicated at 120(1). This ambient air is represented as squares and can include contaminants that are represented as triangles. The contaminants can be more massive and/or dense than the air. The fan blades 114(1) can contact the ambient air at 122(1) and can impart a force on the ambient air and the contaminants. The force generally includes an x direction component and a y direction component. Because of the relatively higher mass/density of the contaminants, the contaminants tend to move outward until contacting a first portion 124(1) of the air guidance structure 116(1) as indicated at 126(1). This is likely due to the centrifugal force generated by the spinning fan blade and the fact that the centrifugal force is more pronounced on the contaminants due to their higher relative mass/density.

The first portion 124(1) of the air guidance structure 116(1) can apply a centripetal force to the contaminants that prevents the contaminants from traveling outward in a straight line. In this case, the contaminants tend to continue to follow the first portion of the air guidance structure 116(1) until encountering the centrifugal separation structure 118(1). The contaminants tend to exit out the centrifugal separation structure 118(1) as indicated at 128(1), while a majority of the air continues to move into a second portion 130(1) of the air guidance structure 116(1). The majority of the air can be guided by the second portion 130(1) to the controlled environment 104(1) along a direction of travel indicated at 132(1).

Stated another way, as the fan blades 114(1) turn, they can induce a velocity vector in the air stream parallel to an axis of the drive mechanism 112(1) (parallel to the y reference axis).

The fan blades can also induce a rotational vector to the air stream around the axis of the drive mechanism 112(1). Any contaminants within the air stream that have a mass/density greater than the air will tend to be forced towards the outside edge of the fan blade 114(1) and against the first portion 124(1) of the air guidance structure 116(1) due to centrifugal forces. The contaminants that are traveling around the air guidance structure 116(1) will tend to pass through and out of the centrifugal separation structure 118(1), such that the air stream reaching the controlled environment 104(1) is automatically cleaned of contaminants. In this implementation, the centrifugal separation structure can be thought of as an elongate aperture in the form of an annulus that extends generally circumferentially to the air guidance structure. An alternative generally parallel relationship is described below relative to FIGS. 3-4 and 6. An alternative orthogonal or transverse relationship is described below relative to FIGS. 8-9.

The reader is now directed specifically to FIG. 2 which shows self-cleaning fan assembly 100(1) incorporated into an enclosure 202(1). Electronic components 204(1)-210(1) are positioned in the enclosure 202(1). Self-cleaning fan assembly 100(1) is configured to draw air from the ambient environment and to clean the air without the need for a filter by separating contaminants from a majority of the air (e.g., cleaned air). The self-cleaning fan assembly 100(1) can deliver the cleaned air to the electronic components 204(1)-210(1) sufficient to remove heat from the electronic components. The heated air can return to the ambient environment as indicated at 212(1).

In this implementation, housing 108(1) also includes a sacrificial space 214(1) connected in gas flowing relation to the centrifugal separation structure 118(1). The sacrificial space 214(1) can serve as a repository of the separated contaminants. The volume of the sacrificial space can be selected so that based upon a given contaminant load the sacrificial space does not fill up before an expected lifespan of the electronic components 204(1)-210(1). Further, the sacrificial space can increase the efficiency of the fan unit 106(1) by creating back pressure at the centrifugal separation structure 118(1). The back pressure can enhance the efficiency of the self-cleaning fan assembly 100(1) in that the back pressure can decrease a percentage of air that passes through the centrifugal separation structure 118(1) and thereby increase the percentage of air that is delivered to the electronic components to provide cooling.

In some cases, the housing 108(1) and/or the enclosure 202(1) can define one or more ports 216(1) from the sacrificial space 214(1) to the ambient environment 102(1). The size, location, and/or number of ports 216(1) along with the area of the centrifugal separation structure 118(1) can influence the amount of backpressure associated with the sacrificial space. Note that while in this implementation the housing 108(1) defines the sacrificial space 214(1), in other implementations the enclosure 202(1) could define the sacrificial space alone or in combination with the housing. Note also, that as used herein, the term "enclosure" can be associated with a computer, a server, a router, a rack, a room, or a data center, among others.

Viewed still another way, arrow 132(1) can be thought of as representing a first air pathway that leads from the fan unit to the electronic components. Arrow 128(1) can be thought of as representing a second air pathway that leads away from the electronic components. This implementation is configured to promote relatively more dense matter, including contaminants, following the second pathway and relatively less dense matter following the first pathway.

In summary, the self-cleaning fan assembly 100(1) can function to draw contaminated air from the ambient environment 102(1) and deliver moving, cleaned air to a controlled environment 104(1) defined by enclosure 202(1). The moving cleaned air can remove heat from electronic components 204(1)-210(1) in the controlled environment and can carry that heat out of the controlled environment. Note that while the present implementations can eliminate the need for a filter, some implementations can include a filter. For instance, a filter could be employed between the air guidance structure 116(1) and the electronic components 204(1)-210(1). In such a configuration, most or all of the contaminants would be removed from the air by the centrifugal separation structure 118(1) before the air reaches the filter.

Figure 3:
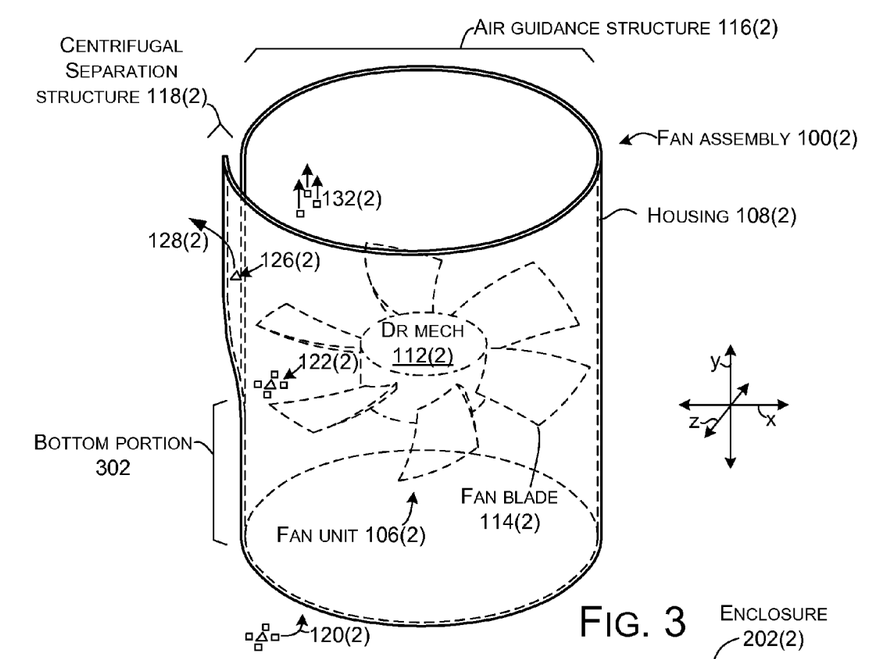
FIG. 3 is a perspective view of another example of a fan assembly that is consistent with the self-cleaning concepts in accordance with some implementations.
Figure 4:
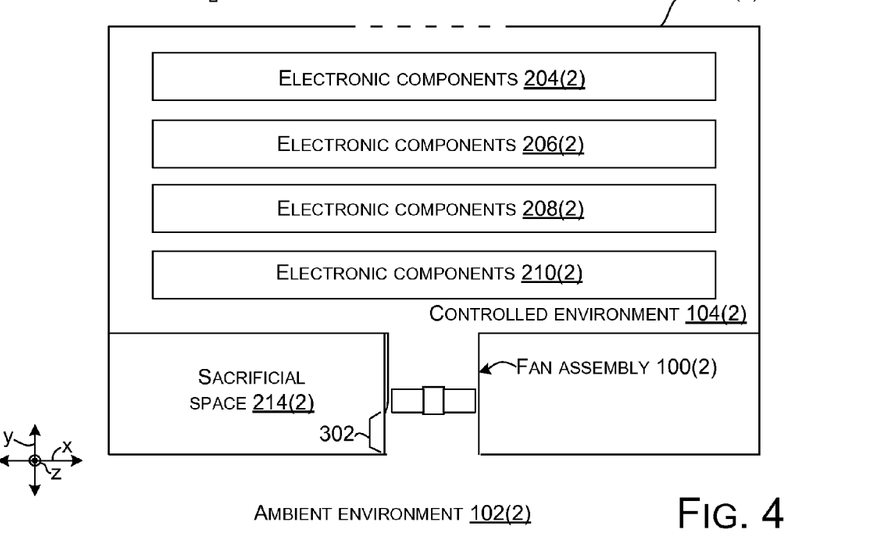
FIG. 4 is a sectional view of another fan assembly system employing the fan assembly of FIG. 3.

FIGS. 3-4 collectively show another self-cleaning fan assembly 100(2) that is somewhat similar to the self-cleaning fan assembly 100(1) described above relative to FIGS. 1-2. For sake of brevity, the components are not re-introduced and the suffix "(2)" is utilized to distinguish the present components from the previous corresponding components having the suffix "(1)". In this case, the centrifugal separation structure 118(2) is oriented generally parallel to the y reference axis. In this case the centrifugal separation structure 118(2) starts proximate to the fan blades 114(2) and continues upstream from the fan blades toward a top of the housing 108(2). A bottom portion 302 of the housing is continuous to prevent air loss and/or to prevent separated contaminants from re-entering the housing 108(2). Thus, the centrifugal separation structure 118(2) begins generally where the fan blades impart rotational forces on the air and any associated contaminants. This configuration can reduce air loss associated with the contaminant separation process. Further, contaminants contained in sacrificial space 214(2) are less likely to be drawn back into the housing 108(2). Of course, in other implementations, the centrifugal separation structure 118(2) may run along less, more or the entirety of a length of the air guidance structure 116(2) when viewed along the y reference axis.

Functionally, the drive mechanism 112(2) can turn the fan blades 114(2) to draw ambient air into the housing as indicated at 120(2). The fan blades 114(2) can contact the ambient air at 122(2) and can impart a force on the ambient air and the contaminants. The contaminants tend to move outward until contacting the air guidance structure 116(2) as indicated at 126(2). The air guidance structure 116(2) can apply a centripetal force to the contaminants that prevents the contaminants from traveling outward in a straight line. In this case, the contaminants tend to continue to follow the air guidance structure 116(2) until encountering the centrifugal separation structure 118(2). The contaminants tend to exit out the centrifugal separation structure 118(2) as indicated at 128(2), while a majority of the air continues to move upwardly in the air guidance structure 116(2) along a direction of travel indicated at 132(2).

Figure 5:
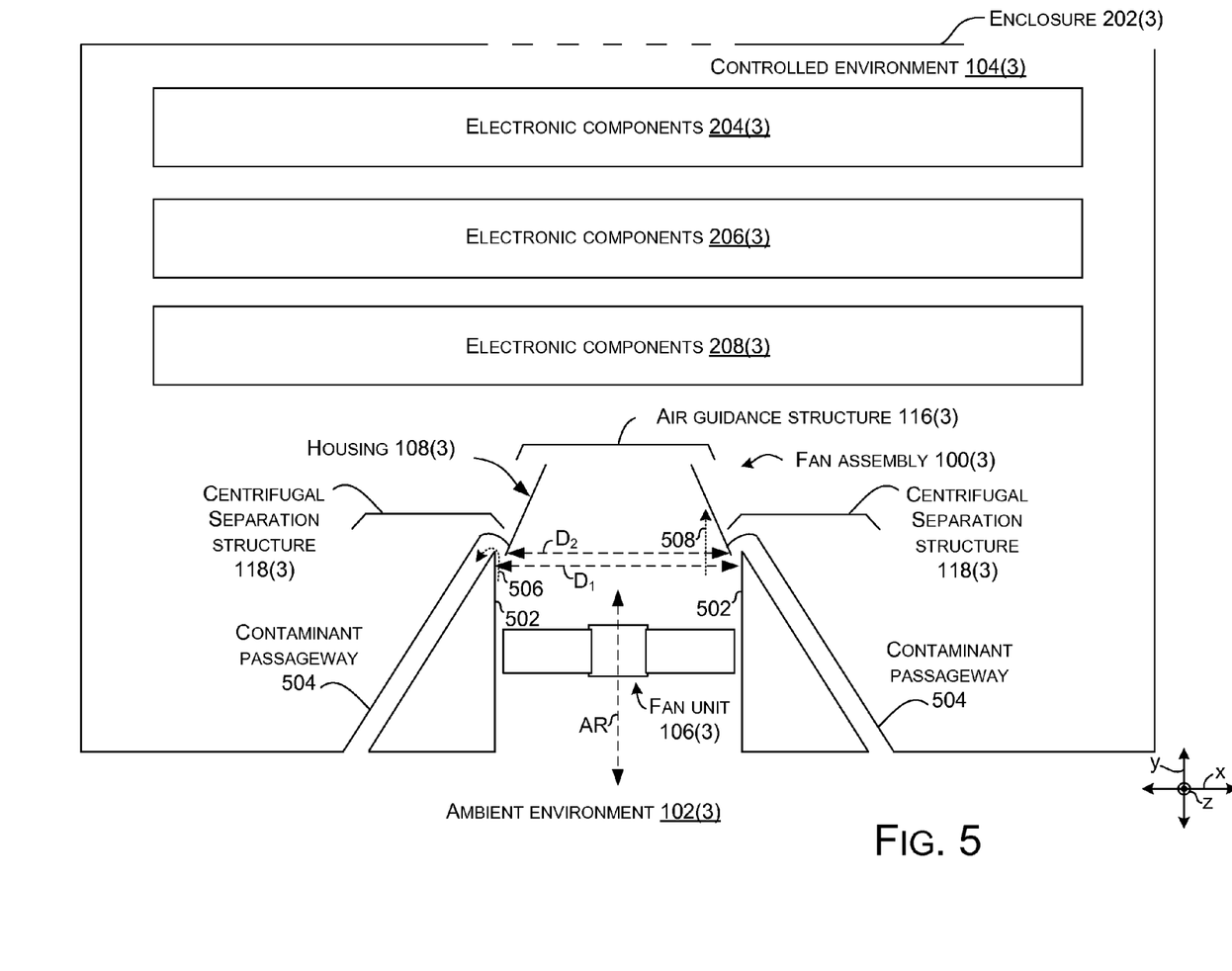
FIG. 5 is a sectional view of another fan assembly system.

FIG. 5 shows another self-cleaning fan assembly 100(3) incorporated into an enclosure 202(3) that protects electronic components 204(3)-208(3). In this implementation, self-cleaning fan assembly 100(3) includes fan unit 106(3) and housing 108(3). The housing includes an air guidance structure 116(3) and a centrifugal separation structure 118(3). In this case, the centrifugal separation structure defines a surface 502 and includes a contaminant passageway(s) 504.

Fan unit 106(3) spins around an axis of rotation (AR) that tends to be parallel to the y reference axis. The spinning of the fan unit can move air proximate to the fan assembly 100(3). Surface 502 can direct air from the fan unit toward the air guidance structure 116(3). Surface 502 can define a first diameter $D_1$ when measured proximate to the air guidance structure 116(3). The air guidance structure can define a second diameter $D_2$ when measured proximate to the centrifugal separation structure 118(3). In this implementation, diameter $D_2$ can be less than diameter D. Accordingly, during operation, contaminants that contact fan blades of fan unit 106(3) tend to spin outward in the x reference direction and contact surface 502 while also traveling upward in the y reference direction. The contaminants tend to continue along surface 502 and not enter the air guidance structure 116(3). Instead, the contaminants are diverted around the air guidance structure and into the contaminant passageway as indicated by arrow 506. In contrast, a majority of the air enters the air guidance structure as indicated by arrow 508.

Stated another way, the fan unit tends to move a majority of the air along the AR axis. In this case, the AR axis is generally parallel to, arrow 508. In some cases, the AR axis can be parallel to, and co-extensive with the airflow represented by arrow 508. In the present configuration, some of the air and contaminants escape via the centrifugal separation structure 118(3) as indicated by arrow 506. The air guidance structure can then direct the remaining majority of the air represented by arrow 508 towards the electronic components 204(3)-208(3).

Contaminants that are separated from the intake air by the centrifugal separation structure 118(3) can enter the contaminant passageway 504, and aided by gravity and/or a minority of the air from the fan unit 106(3), can fall out of the bottom of the housing 108(3). In this particular instance, the contaminant passageway 504 is angled away from the fan assembly to reduce instances of the contaminants being pulled back in with the intake air. Stated another way, in this implementation, the centrifugal separation structure can be thought of as a radially-oriented contaminant collection ring. This contaminant collection ring can also provide backpressure to control the amount of air that escapes from the air guidance structure 116(3). Viewed still another way, arrow 508 can be thought of as representing a first air pathway that leads from the fan unit to the electronic components. Arrow 506 can be thought of as representing a second air pathway that leads away from the electronic components. This implementation is configured to promote relatively more dense/massive matter following the second pathway and relatively less dense/massive matter following the first pathway.

Figure 6:
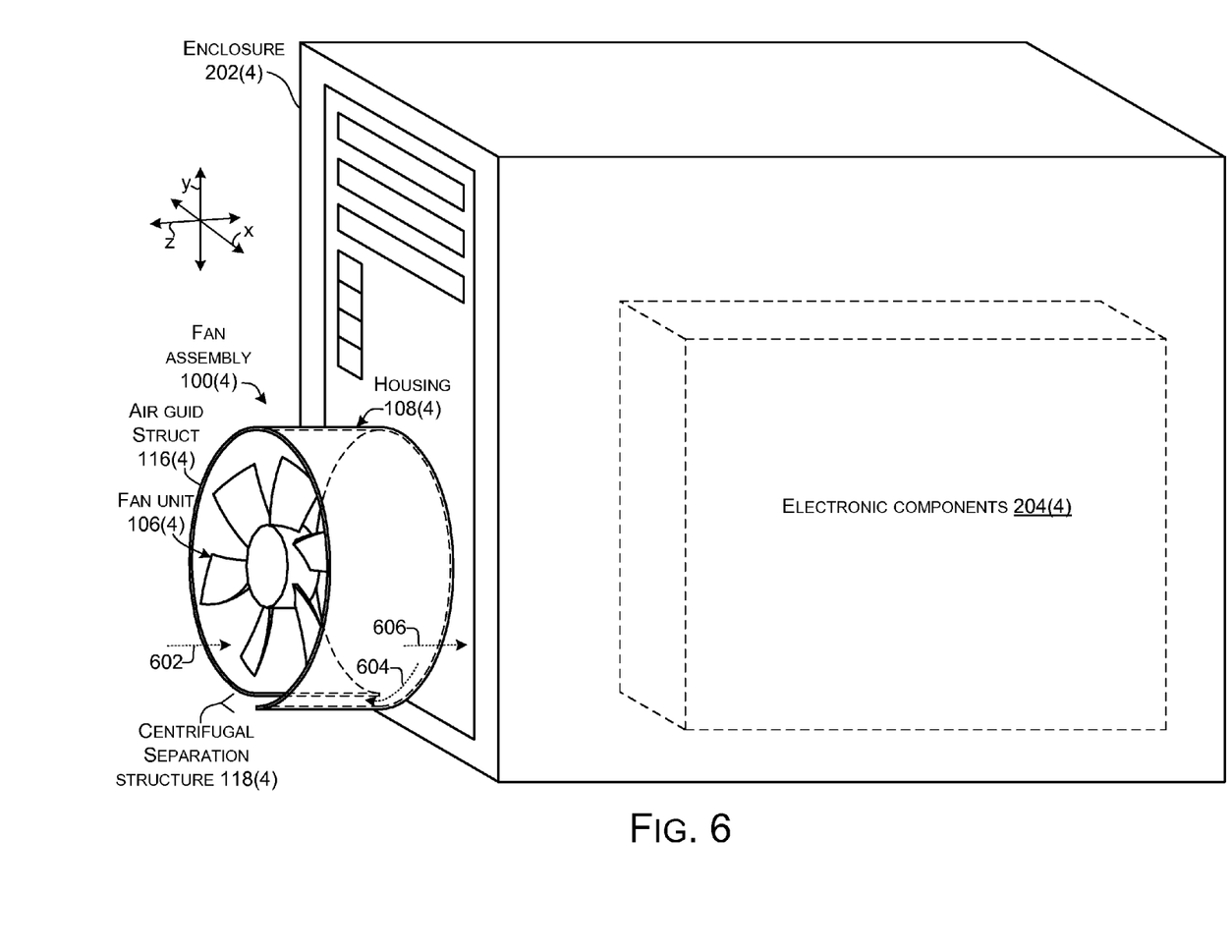
FIGS. 6-9 are perspective views of examples of further fan assembly systems that are consistent with the self-cleaning concepts in accordance with some implementations.

FIG. 6 shows another self-cleaning fan assembly 100(4) that is configured to blow cleaned air into enclosure 202(4) and toward electronics component 204(4). In this implementation, self-cleaning fan assembly 100(4) includes fan unit 106(4) and housing 108(4). The housing includes an air guidance structure 116(4) and a centrifugal separation structure 118(4).

In this case, the self-cleaning fan assembly 100(4) is mounted horizontally (e.g., the axis of rotation of the fan unit 106(4) is horizontal). Further, the centrifugal separation structure 118(4) is positioned at the bottom of the self-cleaning fan assembly 100(4) (e.g., at the six o'clock position). In this configuration, the self cleaning fan assembly can draw in ambient air as indicated by arrow 602. The fan unit 106(4) can impart a rotational force on the intake air. The rotational force can cause any relatively high mass/density contaminants in the intake air to contact the air guidance structure 116(4). The contaminants can then enter the centrifugal separation structure 118(4) as indicated by arrow 604. The contaminants can pass through the centrifugal separation structure 118(4) and fall away from the self cleaning fan assembly 100(4). Thus, this configuration leverages gravity to pull the separated contaminants away from the self cleaning fan unit so that the separated contaminants are less likely to re-enter the self cleaning fan assembly.

In contrast to the separated contaminants, cleaned air can be guided in the z reference direction by the air guidance structure 116(4) as indicated by arrow 606 to cool electronic components 204(4).

Figure 7:
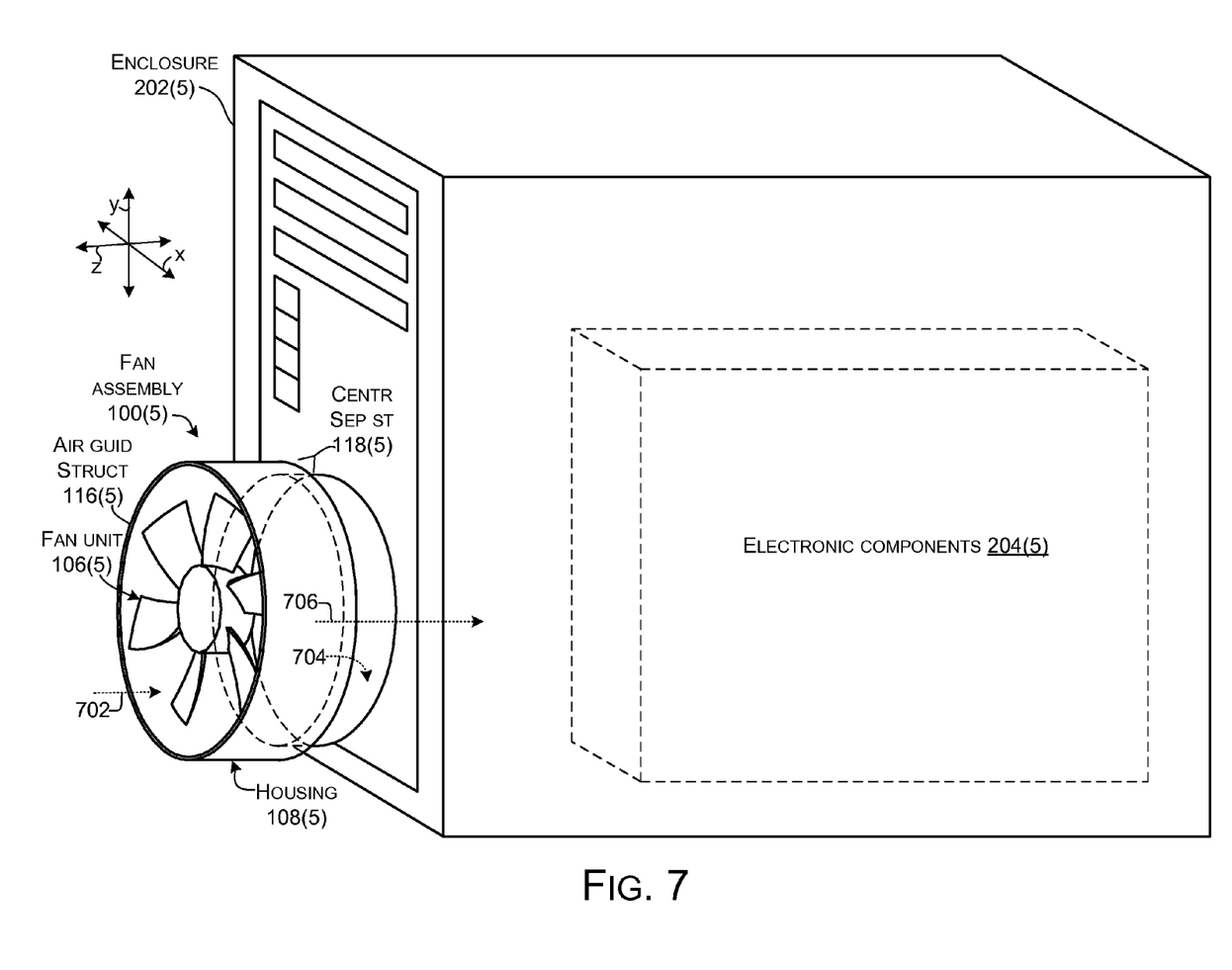

FIG. 7 shows another self-cleaning fan assembly 100(5) that is configured to blow cleaned air into enclosure 202(5) and toward electronics component 204(5). In this implementation, self-cleaning fan assembly 100(5) includes fan unit 106(5) and housing 108(5). The housing includes an air guidance structure 116(5) and a centrifugal separation structure 118(5).

In this case, the self-cleaning fan assembly 100(5) is mounted horizontally (e.g., the axis of rotation of the fan unit 106(5) is horizontal). Further, the centrifugal separation structure 118(5) is positioned circumferentially around the self-cleaning fan assembly 100(5). In this configuration, the self cleaning fan assembly can draw in ambient air as indicated by arrow 702. The fan unit 106(5) can impart a rotational force on the intake air. The rotational force can cause any relatively high mass/density contaminants in the intake air to contact the air guidance structure 116(5). The contaminants can then enter the centrifugal separation structure 118(5) as indicated by arrow 704. The contaminants can pass through the centrifugal separation structure 118(5) and fall away from the self cleaning fan assembly 100(5).

In contrast to the separated contaminants, cleaned air can be guided in the z reference direction by the air guidance structure 116(5) as indicated by arrow 706 to cool electronic components 204(5).

Figure 8:
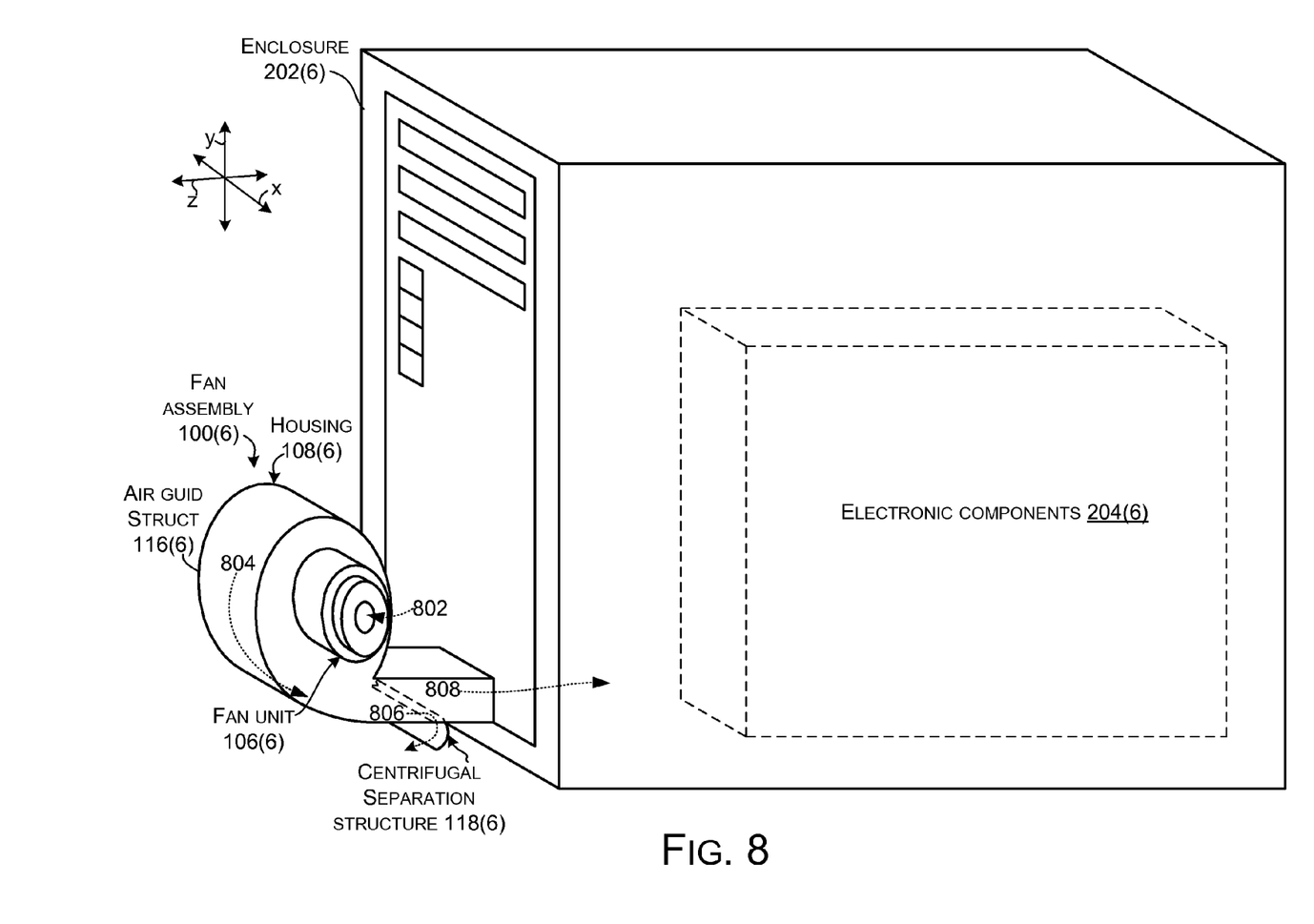
Figure 9:
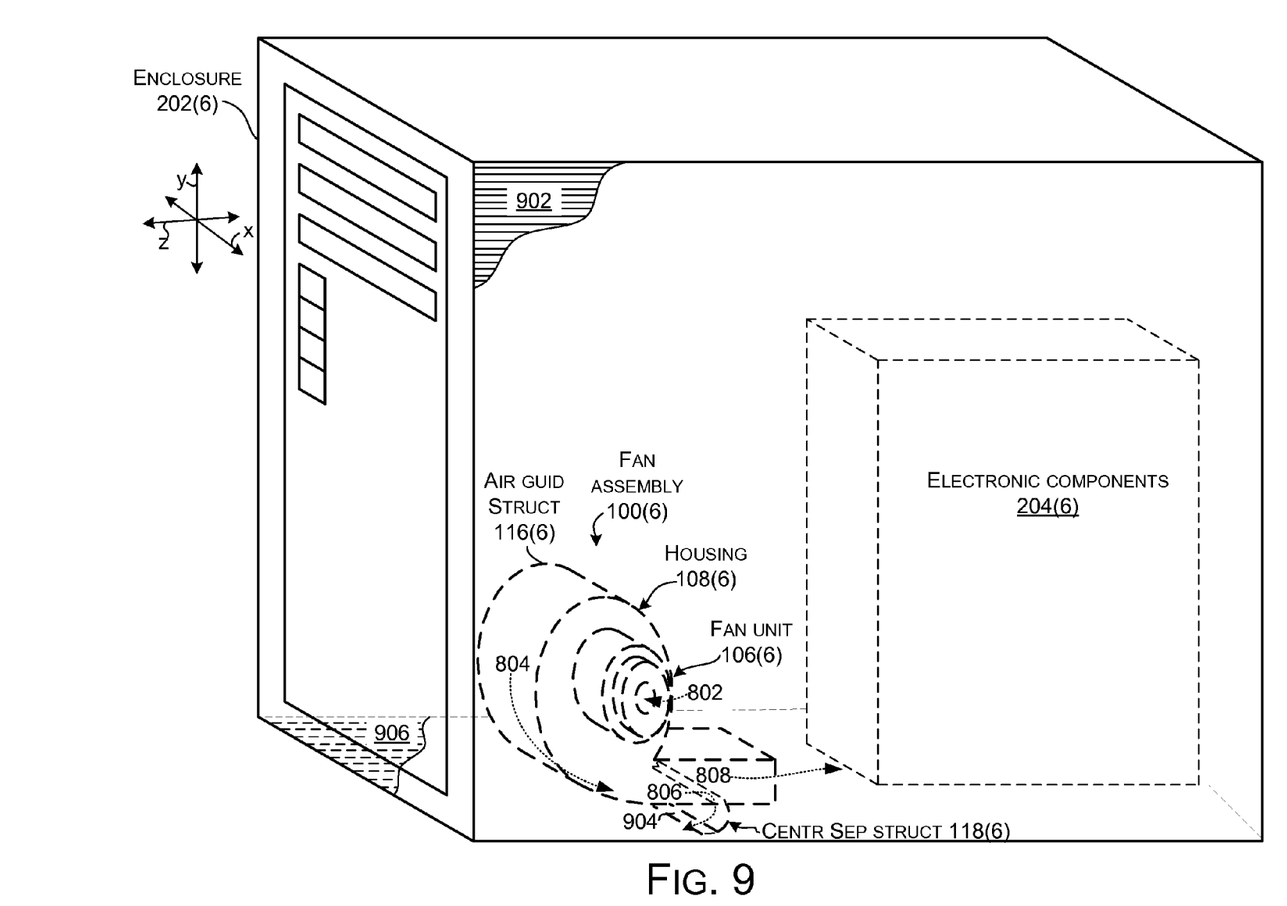

FIGS. 8-9 show another self-cleaning fan assembly 100(6). In this case the self-cleaning fan assembly is implemented in a squirrel cage configuration. In the implementation represented in FIG. 8, the self-cleaning fan assembly 100(6) is mounted external to enclosure 202(6), while in the implementation represented in FIG. 9, the self-cleaning fan assembly 100(6) is mounted within enclosure 202(6).

In this case, self-cleaning fan assembly 100(6) includes fan unit 106(6) and housing 108(6). The housing includes an air guidance structure 116(6) and a centrifugal separation structure 118(6). Operation of the fan unit 106(6) draws air into the housing 108(6) at 802. The fan unit 106(6) imparts a rotational force on the air which tends to cause contaminants to travel along an outer wall of the air guidance structure as indicated by arrow 804. The contaminants then encounter the centrifugal separation structure 118(6) and are directed downward out of the fan assembly 100(6) as indicated by arrow 806. A majority of the now cleaned air travels out the outlet of the housing 108(6) as indicated by arrow 808 and can cool the electronic components 204(6).

In the case of FIG. 9, self-cleaning fan assembly 100(6) is positioned in the enclosure 202(6). As indicated by arrow 802, air passes through a hole, such as a vent in a front surface 902 of the enclosure 202(6) into the fan unit 106(6). Further, in this configuration the centrifugal separation structure 118(6) can be positioned over a corresponding opening 904 in a bottom surface 906 of the enclosure 202(6) so that contaminants separated by the centrifugal separation structure pass out of the enclosure through the opening.

In the implementations represented in FIGS. 8-9, the centrifugal separation structure can be thought of as an elongate aperture that extends generally transverse to the air guidance structure 116(6). Stated another way, the centrifugal separation structure 118(6) can be thought of as an elongate aperture that extends generally transverse to a direction of movement of a majority of the air in the air guidance structure 116(6).

The above described fan assemblies can be made from various materials including metals, plastics, composites, and/or combinations thereof, among others. Further, the present self-cleaning air moving concepts are explained in the discussion above relative to several different types of fan assembly designs. This explanation is deemed sufficient to convey the present concepts, but is not intended to be limiting. Instead, the skilled artisan should recognize that the present concepts can be applied to other types of fan assembly designs.

CONCLUSION

Although techniques, methods, devices, systems, etc., pertaining to self-cleaning air moving are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system, comprising:
an enclosure;
electronic components positioned in the enclosure;
a fan assembly mounted in the enclosure so that an axis of rotation of the fan assembly is horizontal, the fan assembly configured to:
impart rotational force on air to move the air from outside the enclosure to inside the enclosure and around the electronic components,
separate contaminants from the air based upon differences in density between the separated contaminants and the air; and
a centrifugal separation structure positioned at a bottom of the fan assembly, wherein the positioning of the centrifugal separation structure is configured to leverage gravity so that the separated contaminants fall away from the fan assembly.

2. The system of claim 1, wherein the enclosure further includes a sacrificial space in gas flowing relation to the centrifugal separation structure and configured to receive the separated contaminants.

3. The system of claim 2, further comprising a contaminant passageway leading from the centrifugal separation structure to the sacrificial space, wherein the contaminant passageway and the sacrificial space are configured to provide backpressure that decreases a percentage of the air that travels with the contaminants and increases a percentage of the air delivered to the electronic components, such that a majority of the air is directed towards the electronic components.

4. The system of claim 1, further comprising an opening in a bottom surface of the enclosure, the opening being in gas flowing relation to the centrifugal separation structure and configured so that separated contaminants are directed outside the enclosure.

5. The system of claim 1, wherein the centrifugal separation structure comprises an elongate aperture oriented parallel to the axis of rotation of the fan assembly.

6. The system of claim 5, wherein a length of the elongate aperture of the centrifugal separation structure is generally a same measurement as a width of a housing of the fan assembly measured parallel to the axis of rotation of the fan assembly.

7. The system of claim 1, wherein the centrifugal separation structure comprises an elongate aperture oriented transverse to the axis of rotation of the fan assembly.

8. The system of claim 1, wherein the centrifugal separation structure comprises an elongate aperture that extends along less than an entirety of a length of a housing of the fan assembly.

9. A fan assembly, comprising:
a housing with a first portion and a second portion, wherein the first portion of the housing is continuous to prevent air loss;
a fan unit configured to draw air through the first portion of the housing toward the second portion;
an air guidance structure located in the second portion of the housing, wherein the air guidance structure is configured to guide the air along an axis; and,
a centrifugal separation structure comprising an elongate aperture that is generally parallel to the axis, the centrifugal separation structure configured to allow contaminants in the air to escape the air guidance structure by moving transverse to the axis,
wherein the elongate aperture is longer than a height of fan blades measured parallel to the axis.

10. The fan assembly of claim 9, wherein the fan unit includes multiple fan blades that rotate around an axis of rotation and wherein the axis is co-extensive with the axis of rotation.

11. The fan assembly of claim 9, wherein the fan assembly is mounted in an enclosure and configured to move the air from outside the enclosure to inside the enclosure and around electronic components inside the enclosure.

12. The fan assembly of claim 11, wherein the centrifugal separation structure is configured to direct separated contaminants outside the enclosure.

13. A system, comprising:
an electronic component positioned in an enclosure;
a housing that defines a first air pathway toward the electronic component and a second air pathway away from the electronic component; and,
a fan unit positioned relative to the housing and configured to move air relative to the first air pathway and the second air pathway, wherein the fan unit causes relatively dense contaminants in the air to be separated and follow the second air pathway away from the electronic component while a majority of the air follows the first pathway towards the electronic component,
wherein the second air pathway comprises a contaminant passageway configured to lead the separated contaminants away from the fan unit such that the separated contaminants are:
directed out of the housing,
directed away from the electronic component, and
directed away from an air intake of the fan unit.

14. The system of claim 13, wherein:
the housing comprises an air guidance structure that defines the first air pathway, and
the fan unit rotates around an axis and imparts a force on the contaminants that is transverse to the axis, and the force causes the separated contaminants to follow the second air pathway.

15. The system of claim 13, wherein the housing comprises an air guidance structure that defines the first air pathway and a centrifugal separation structure that defines the second air pathway.

16. The system of claim 13, wherein the contaminant passageway is angled away from the air intake of the fan unit.

17. The system of claim 14, wherein a centrifugal separation structure allows the contaminants to resume moving transverse to an axis of rotation of the fan unit so that the separated contaminants follow the second air pathway.

18. The system of claim 13, wherein the housing is positioned within the enclosure.

19. The system of claim 13, wherein the housing is positioned within the enclosure and further comprising a sacrificial space defined within the enclosure and configured to receive the separated contaminants from the contaminant passageway.

20. The system of claim 13, wherein the housing is positioned within the enclosure and wherein the contaminant passageway leads outside the enclosure and is configured to create backpressure on the second pathway.

* * * * *